(12) United States Patent
Alpaslan et al.

(10) Patent No.: US 8,928,969 B2
(45) Date of Patent: Jan. 6, 2015

(54) SPATIO-OPTICAL DIRECTIONAL LIGHT MODULATOR

(75) Inventors: Zahir Y. Alpaslan, Carlsbad, CA (US); Hussein S. El-Ghoroury, Carlsbad, CA (US); Jingbo Cai, Vista, CA (US); Dale A. McNeill, Encinitas, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 369 days.

(21) Appl. No.: 13/329,107

(22) Filed: Dec. 16, 2011

(65) Prior Publication Data

US 2013/0141895 A1 Jun. 6, 2013

Related U.S. Application Data

(60) Provisional application No. 61/567,520, filed on Dec. 6, 2011.

(51) Int. Cl.
*G02B 26/08* (2006.01)
*G02B 26/00* (2006.01)
*G02B 27/10* (2006.01)

(52) U.S. Cl.
USPC ............................ 359/298; 359/291; 359/619

(58) Field of Classification Search
USPC ......................................... 359/290–298, 619
See application file for complete search history.

(56) References Cited

U.S. PATENT DOCUMENTS

| | | | |
|---|---|---|---|
| 5,059,008 A | 10/1991 | Flood et al. | |
| 5,691,836 A * | 11/1997 | Clark | 359/247 |
| 5,986,811 A | 11/1999 | Wohlstadter | |
| 6,137,535 A | 10/2000 | Meyers | |
| 6,151,167 A | 11/2000 | Melville | |
| 6,433,907 B1 | 8/2002 | Lippert et al. | |
| 6,795,221 B1 | 9/2004 | Urey | |
| 6,795,241 B1 | 9/2004 | Holzbach | |
| 6,803,561 B2 | 10/2004 | Dunfield | |
| 6,924,476 B2 | 8/2005 | Wine et al. | |
| 6,937,221 B2 | 8/2005 | Lippert et al. | |
| 6,999,238 B2 | 2/2006 | Glebov et al. | |
| 7,009,652 B1 | 3/2006 | Tanida et al. | |
| 7,061,450 B2 | 6/2006 | Bright et al. | |

(Continued)

FOREIGN PATENT DOCUMENTS

| | | |
|---|---|---|
| EP | 2190019 | 5/2010 |
| EP | 2398235 | 12/2011 |

(Continued)

OTHER PUBLICATIONS

"International Search Report and Written Opinion of the International Searching Authority Dated Mar. 19, 2013, International Application No. PCT/US2012/068029", (Mar. 19, 2013).

(Continued)

*Primary Examiner* — Mohammed Hasan

(74) *Attorney, Agent, or Firm* — Blakely Sokoloff Taylor & Zafman LLP (57) ABSTRACT

A novel spatio-optical directional light modulator with no moving parts is introduced. This directional light modulator can be used to create 2D/3D switchable displays of various sizes for mobile to large screen TV. The inherently fast modulation capability of this new directional light modulator increases the achievable viewing angle, resolution, and realism of the 3D image created by the display.

24 Claims, 8 Drawing Sheets

(56) References Cited

U.S. PATENT DOCUMENTS

| | | |
|---|---|---|
| 7,071,594 B1 | 7/2006 | Yan et al. |
| 7,106,519 B2 | 9/2006 | Aizenberg et al. |
| 7,190,329 B2 | 3/2007 | Lewis et al. |
| 7,193,758 B2 | 3/2007 | Wiklof et al. |
| 7,209,271 B2 | 4/2007 | Lewis et al. |
| 7,215,475 B2 | 5/2007 | Woodgate et al. |
| 7,232,071 B2 | 6/2007 | Lewis et al. |
| 7,286,143 B2 | 10/2007 | Kang et al. |
| 7,292,257 B2 | 11/2007 | Kang et al. |
| 7,324,687 B2 | 1/2008 | Zitnick, III et al. |
| 7,369,321 B1 | 5/2008 | Ren et al. |
| 7,379,583 B2 | 5/2008 | Zitnick, III et al. |
| 7,400,439 B2 | 7/2008 | Holman |
| 7,482,730 B2 | 1/2009 | Davis et al. |
| 7,486,255 B2 | 2/2009 | Brown et al. |
| 7,561,620 B2 | 7/2009 | Winder et al. |
| 7,580,007 B2 | 8/2009 | Brown et al. |
| 7,609,906 B2 | 10/2009 | Matusik et al. |
| 7,619,807 B2 | 11/2009 | Baek et al. |
| 7,620,309 B2 | 11/2009 | Georgiev |
| 7,623,560 B2 | 11/2009 | El-Ghoroury et al. |
| 7,630,118 B2 * | 12/2009 | Onvlee .......................... 359/290 |
| 7,639,293 B2 | 12/2009 | Narabu |
| 7,656,428 B2 | 2/2010 | Trutna, Jr. |
| 7,671,893 B2 | 3/2010 | Li et al. |
| 7,702,016 B2 | 4/2010 | Winder et al. |
| 7,703,924 B2 | 4/2010 | Nayar |
| 7,724,210 B2 | 5/2010 | Sprague et al. |
| 7,732,744 B2 | 6/2010 | Utagawa |
| 7,767,479 B2 | 8/2010 | El-Ghoroury et al. |
| 7,780,364 B2 | 8/2010 | Raskar et al. |
| 7,791,810 B2 | 9/2010 | Powell |
| 7,792,423 B2 | 9/2010 | Raskar et al. |
| 7,829,902 B2 | 11/2010 | El-Ghoroury et al. |
| 7,841,726 B2 * | 11/2010 | Conner .......................... 353/94 |
| 7,872,796 B2 | 1/2011 | Georgiev |
| 7,880,794 B2 | 2/2011 | Yamagata et al. |
| 7,897,910 B2 | 3/2011 | Roichman et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,952,809 B2 | 5/2011 | Takai |
| 7,956,924 B2 | 6/2011 | Georgiev |
| 7,962,033 B2 | 6/2011 | Georgiev |
| 7,965,936 B2 | 6/2011 | Raskar et al. |
| 8,009,358 B2 * | 8/2011 | Zalevsky et al. .............. 359/618 |
| 8,019,215 B2 | 9/2011 | Georgiev et al. |
| 8,049,231 B2 | 11/2011 | El-Ghoroury et al. |
| 8,106,994 B2 | 1/2012 | Ichimura |
| 8,126,323 B2 | 2/2012 | Georgiev et al. |
| 2006/0098285 A1 | 5/2006 | Woodgate et al. |
| 2006/0221209 A1 | 10/2006 | McGuire et al. |
| 2007/0109813 A1 | 5/2007 | Copeland et al. |
| 2008/0117491 A1 | 5/2008 | Robinson |
| 2009/0086170 A1 | 4/2009 | El-Ghoroury et al. |
| 2009/0278998 A1 | 11/2009 | El-Ghoroury et al. |
| 2010/0003777 A1 | 1/2010 | El-Ghoroury et al. |
| 2010/0026852 A1 | 2/2010 | Ng et al. |
| 2010/0026960 A1 | 2/2010 | Sprague |
| 2010/0066921 A1 | 3/2010 | El-Ghoroury et al. |
| 2010/0085468 A1 | 4/2010 | Park et al. |
| 2010/0091050 A1 | 4/2010 | El-Ghoroury et al. |
| 2010/0220042 A1 | 9/2010 | El-Ghoroury et al. |
| 2010/0245957 A1 | 9/2010 | Hudman et al. |
| 2010/0265386 A1 | 10/2010 | Raskar et al. |
| 2011/0096156 A1 | 4/2011 | Kim et al. |

FOREIGN PATENT DOCUMENTS

| | | |
|---|---|---|
| JP | 2008-304572 | 12/2008 |
| JP | 2010-117398 | 5/2010 |
| WO | WO-2005/048599 | 5/2005 |
| WO | WO-2007/092545 | 8/2007 |
| WO | WO-2011/065738 | 6/2011 |

OTHER PUBLICATIONS

Adelson, Edward H., et al., "Single Lens Stero with a Plenoptic Camera", *IEEE Transactions on Pattern Analysis and Machine Intelligence*, vol. 14, No. 2, (Feb. 1992), pp. 99-106.

Bolles, Robert C., et al., "Epipolar-Plane Image Analysis: An Approach to Determining Structure from Motion", *International Journal of Computer Vision*, vol. 1, (1987), p. 7-55, February.

Georgiev, Todor, et al., "Light Field Camera Design for Integral View Photography", *Adobe Technical Report*, (2003), pp. 1-13, January.

Nayar, Shree K., "Computational Cameras: Approaches, Benefits and Limits", *Columbia University Technical Report No. CUCS-001-11*, (Jan. 15, 2011), pp. 1-22.

Ng, Ren, "Digital Light Field Photography", *Stanford University Doctorial Thesis*, (Jul. 2006), 203 pp. total.

Ng, Ren, et al., "Light Field Photography with a Hand-held Plenoptic Camera", *Stanford University Tech Report CTSR 2005-02*, (2005), pp. 1-11, July.

Veeraraghavan, Ashok, et al., "Dappled Photography: Mask Enhanced Cameras for Heterodyned Light Fields and Coded Aperture Refocusing", *Mitsubishi Electric Research Laboratories (MERL) TR2007-115; ACM Transactions on Graphics*, vol. 26, No. 3, Article 69, (Jul. 2007), pp. 69-1-69-12, 14 pp. total.

"Invitation to Pay Additional Fees, Partial Search Report Dated Jan. 25, 2013, International Application No. PCT/US2012/068028", (Jan. 25, 2013).

"International Search Report and Written Opinion of the International Searching Authority Dated Sep. 18, 2013; International Application No. PCT/US2012/068028", (Sep. 18, 2013).

"Office Action Dated Nov. 22, 2013; U.S. Appl. No. 13/546,858", (Nov. 22, 2013).

"Office Action Dated Sep. 26, 2013; U.S. Appl. No. 13/546,858", (Sep. 26, 2013).

"Notice of Allowance Dated May 30, 2014; U.S. Appl. No. 13/546,858", (May 30, 2014).

\* cited by examiner

Figure 6

SPATIO-OPTICAL DIRECTIONAL LIGHT MODULATOR

CROSS-REFERENCE TO RELATED APPLICATIONS

This application claims the benefit of U.S. Provisional Patent Application No. 61/567,520 filed Dec. 6, 2011.

BACKGROUND OF THE INVENTION

1. Field of the Invention

Directional light modulation, 3D displays, emissive micro displays, 2D/3D autostereoscopic switchable displays.

2. Prior Art

In some switchable 2D/3D displays a directional backlight is necessary to operate the display in different display modes. In a 2D display mode, a backlight with uniform illumination and large angular coverage is required to display a single image with spatial light modulators (such as liquid crystal displays (LCD)). In a 3D display mode, a backlight with uniform illumination and multiple illumination directions is required to display images of the same scene from different directions by utilizing some combination of spatial multiplexing and temporal multiplexing in the spatial light modulator.

In both 2D and 3D modes, the light that comes from the directional backlight is usually processed by a directionally selective filter (such as diffractive plate, a holographic optical plate etc.) before it reaches the spatial light modulator pixels to expand the light beam uniformly while keeping its directionality.

Figure 2:
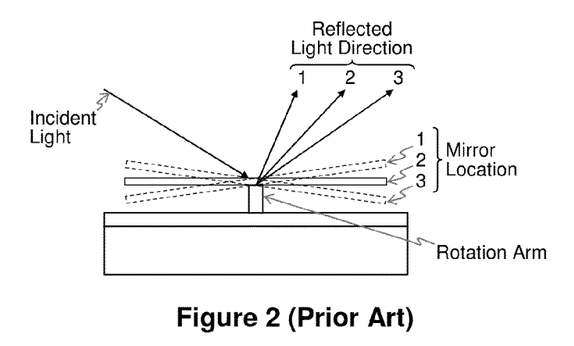
FIG. 2 illustrates a prior art directional light modulator that uses rotating mirrors.
Figure 3:
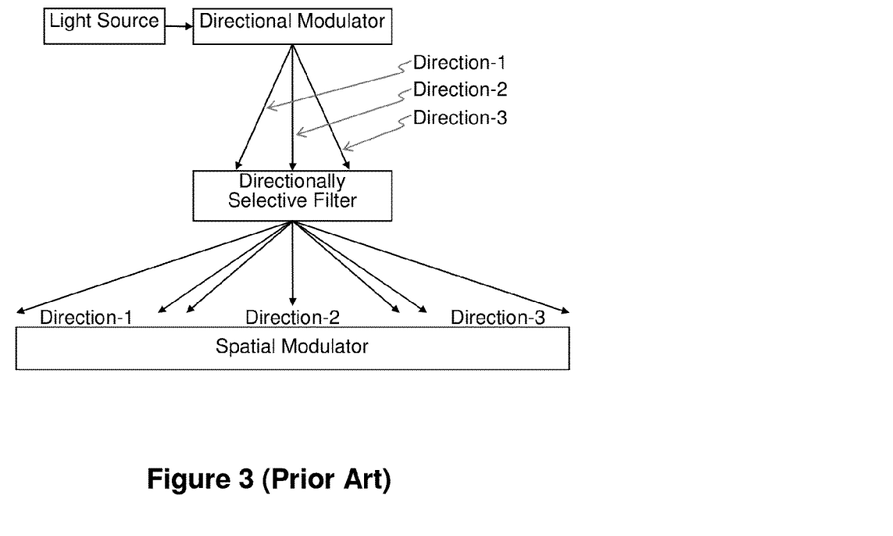
FIG. 3 illustrates a prior art directionally modulated 3D light modulator.

Currently available directional light modulators are a combination of an illumination unit comprising multiple light sources and a directional modulation unit that directs the light emitted by the light sources to a designated direction (see FIG. 3). An illumination unit is usually combined with an electro-mechanical movement device such as rotating mirrors or rotating barriers (see U.S. Pat. Nos. 6,151,167, 6,433,907, 6,795,221, 6,803,561, 6,924,476, 6,937,221, 7,061,450, 7,071,594, 7,190,329, 7,193,758, 7,209,271, 7,232,071, 7,482,730, 7,486,255, 7,580,007, 7,724,210, and 7,791,810 and U.S. Patent Application Publication Nos. 2010/0026960 and 2010/0245957), or electro-optical device such as liquid lenses or polarization switching (see FIG. 1 and FIG. 2 and U.S. Pat. Nos. 5,986,811, 6,999,238, 7,106,519, 7,215,475, 7,369,321, 7,619,807 and 7,952,809).

In both electro-mechanically and electro-optically modulated directional light modulators there are three main problems:

1. Speed: When electrical energy is used to create mechanical movement or optical change, the movement or change is not achieved instantaneously. Usually a type of acceleration, deceleration and stabilization has to be achieved to reach the desired mechanical or optical state. The speed of these operations usually takes up a significant portion of the frame time that reduces the efficiency and limits the achievable display brightness.

2. Volumetric thickness of the device: Both of these methods need a distance between the light source and directional modulation device to work with, which increases the total thickness of a display.

3. Light loss: Coupling light on to a moving mirror assembly or using a liquid lens with adjustable focal length creates a light loss on the order of 50% to 90% which in turn requires more power consumption to compensate for the light loss, and creates heat in the system that has to be eliminated by a cooling method.

In addition to being slow, bulky and optically lossy, the prior art directional backlight units need to have narrow spectral bandwidth, high collimation and individual controllability for being combined with a directionally selective filter for 2D-3D switchable display purposes. Achieving narrow spectral bandwidth and high collimation requires device level innovations and optical light conditioning, increasing the cost and the volumetric aspects of the overall system. Achieving individual controllability requires additional circuitry and multiple light sources, increasing the system complexity, bulk and cost.

It is therefore an objective of this invention to introduce a spatio-optical light modulator that overcomes the drawbacks of the prior art, thus making it feasible to create 3D displays that provide practical volumetric and viewing experience. Additional objectives and advantages of this invention will become apparent from the following detailed description of a preferred embodiment thereof that proceeds with reference to the accompanying drawings.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

References in the following detailed description of the present invention to "one embodiment" or "an embodiment" means that a particular feature, structure, or characteristics described in connection with the embodiment is included in at least one embodiment of the invention. The appearances of the phrase "in one embodiment" in various places in this detailed description are not necessarily all referring to the same embodiment.

A new class of emissive display devices called Quantum Photonic Imagers (QPI™, a trademark of Ostendo Technologies, Inc.) has been recently introduced (see U.S. Pat. Nos. 7,623,560, 7,767,479, 7,829,902 and 8,049,231 and U.S. Patent Application Publication Nos. 2009/0086170, 2009/0278998, 2010/0003777, 2010/0066921, 2010/0091050 and 2010/0220042). The QPI devices feature high brightness, very fast light amplitude modulation and spatial modulation capabilities in a very small device volume that includes all the driver circuitry.

The present invention combines the emissive micro array capabilities of the QPI device with passive wafer level optics (WLO) to create a light modulator that can perform the functionalities of a directional light source and a diffractive plate at the same time. As used herein, wafer level or wafer means a device or matrix of devices having a diameter of at least 2 inches, and more preferably 5 inches or more. WLO are fabricated monolithically on the wafer from polymer using ultra violet (UV) imprint lithography. Among primary advantages of WLO are the ability to fabricate micro lens arrays and to be able to precisely align multiple WLO optical elements together and with an optoelectronics device such as a CMOS sensor or the QPI device. The alignment precision that can be achieved by a typical WLO fabrication technique can be less than one micron. The combination of the digitally addressable emissive micro emitter pixel array of the QPI device and the WLO micro lens array (MLA) that can be precisely aligned with respect to the micro emitter array of the QPI device eliminates the need for having a directionally selective filter in the system while relaxing the requirement for the narrow spectral bandwidth in the light source, reducing the system volume, complexity and cost simultaneously.

Figure 1:
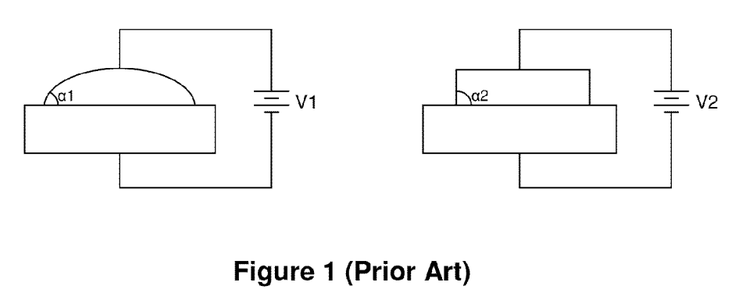
FIG. 1 illustrates a prior art directional light modulator that uses liquid lens.
Figure 4:
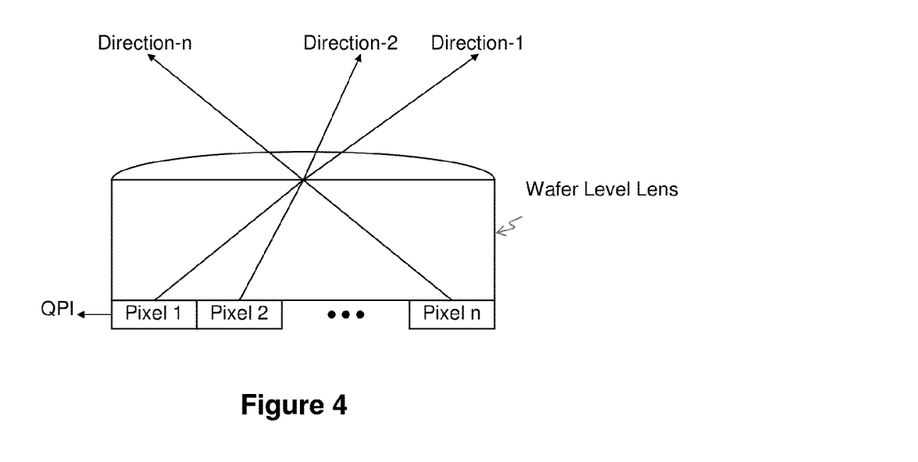
FIG. 4 is a two dimensional view of the directional light modulation principle of the spatio-optical directional light modulator of this invention.
Figure 5:
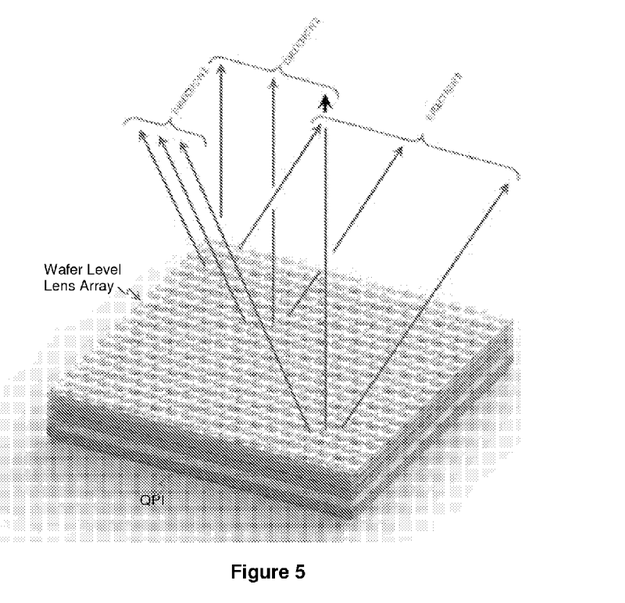
FIG. 5 is an isometric view of the directional light modulation principle of the spatio-optical directional light modulator of this invention.

With a fine pitch wafer level collimating MLA, the light emitted from the QPI device micro emitter array of pixels can be modulated directionally as illustrated in FIG. 4 and spatially as illustrated in FIG. 5. FIG. 4 illustrates the directional modulation principle of the present invention. As illustrated in FIG. 4, a multiplicity of the individually addressable light emitting pixels Pixel 1, Pixel 2, . . . , Pixel-n ($p_1, p_2, \ldots, p_n$) of the QPI device are associated with a single micro lens of the MLA. Referring to FIG. 1, the light from $p_1$ would be refracted by the wafer level micro lens and traverse to $d_1$, the light from $p_2$ would be refracted by the wafer level micro lens and traverse to direction $d_2$ and the light from $p_n$ would refracted by the wafer level micro lens and traverses to $d_n$ whereby directions Direction-1, Direction-2, . . . , Direction-n ($d_1, d_2, \ldots, d_n$) are distributed directionally across the numerical aperture of the micro lens. With the individual addressability of QPI device pixels $p_1, p_2, \ldots, p_n$, the directions of emitted light into the directions $d_1, d_2, \ldots, d_n$ become also individually addressable.

FIG. 5 illustrates the spatial and directional modulation principles of the present invention. FIG. 5 illustrates a 2-dimensional array comprising a multiplicity of QPI device pixel groups $G_1, G_2, \ldots, G_N$ with each such pixel group associated with one micro lens of a wafer level micro lens array (MLA). With the one-to-one association of the individual pixels $p_1, p_2, \ldots, p_n$ within each group with the emitted light directions $d_1, d_2, \ldots, d_n$, it becomes possible for the light emitting device illustrated in FIG. 5 to generate light that can be spatially and directionally modulated. Thus the light can be emitted from each of the spatial locations in the emissive area of the QPI device pixel groups $G_1, G_2, \ldots, G_N$ and be individually addressable through the addressability of the pixel groups as well as the directionally addressable through the addressability of the individual pixel within each pixel group. The individual pixels of the QPI device can be modulated so that each lens in the MLA can emit light to multiple directions simultaneously. Because of individual pixel control, the light amplitude, the time duration of the light emission, the specific light direction and the total number of light directions emitted from each micro lens can be individually adjusted through the individual addressability of the QPI device pixels.

It is obvious to a person skilled in the art that the directional modulation by a lens can be done on a single axis, or on two axes with the choice of lens type (i.e., lenticular lens array or two-axis lens array). However, precise alignment of the lens array with the pixelated light source and the achievability of small pixel size (in the order of few microns, or 10 microns or less) have prevented the realization of a directional light modulator that can generate the directional light modulation capabilities needed to create high definition 3D displays. In the present invention the high pixel resolution is achieved by leveraging the emissive micro pixel array of the QPI device, which can attain less than 10 micron pixel pitch, and the high precision alignment of lens array, which can be less than one micron, made possible by the wafer level optics. This allows the spatio-optical light modulator of this invention to achieve the spatial as well as directional modulation resolution sufficient to realize a high definition 3D displays.

Figure 6:
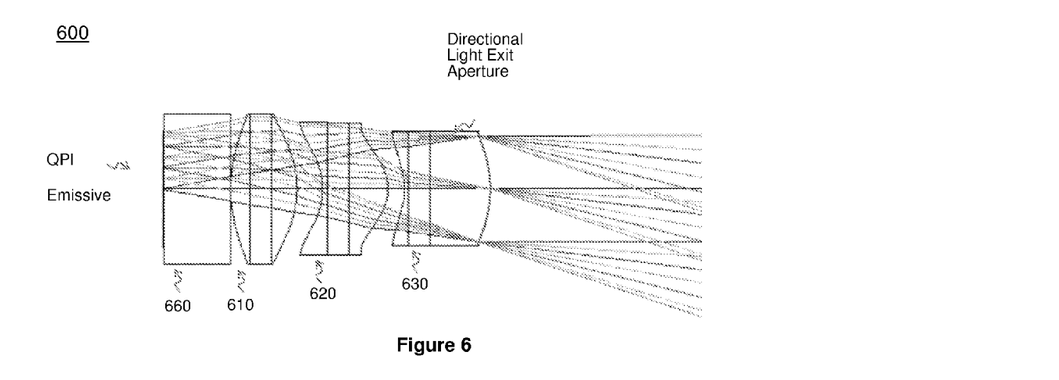
FIG. 6 illustrates an exemplary collimating wafer level optics design of the spatio-optical directional light modulator of this invention.
Figure 7:
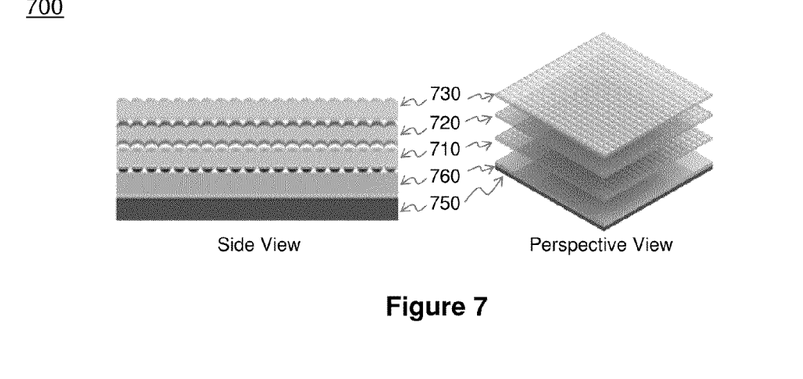
FIG. 7 illustrates an exemplary design of the spatio-optical directional light modulator of this invention that uses wafer level optics exemplary design illustrated in FIG. 6.

FIGS. 6 and 7 show an exemplary embodiment of the present invention. Referring to FIG. 6 of this exemplary embodiment, the light emitted from each individual pixel within a pixel group $G_i$ travels from the QPI device emissive surface to the exit aperture of a micro lens that comprises the three optical elements 610, 620 and 630. The light emitted from each individual pixel within a pixel group $G_i$ would be collimated and magnified to fill the exit aperture of the WLO micro lens system 610, 620 and 630 and traverses at a specific direction within a $\Theta=\pm15°$ angular divergence. In essence the micro lens system 610, 620 and 630 would map the light emitted from the individual pixels of the two dimensional pixel group $G_i$ comprising the QPI device into individual directions within the three dimensional volume defined by $\Theta=\pm15°$ angular divergence of the WLO micro lens system 610, 620 and 630.

Referring to FIG. 6 of the exemplary embodiment, a multiplicity of the micro lens elements 610, 620 and 630 are fabricated to form a micro lens arrays 710, 720 and 730 which would be precisely aligned relative to each other and relative to the associated arrays of the QPI device pixel groups $G_1$, $G_2, \ldots, G_N$. The exemplary embodiment illustrated in FIG. 7 also includes the QPI device 750 and its associated cover glass 760. The design of the micro lens elements 610, 620 and 630 would take into account the thickness and optical characteristics of the QPI device cover glass 760 in order to image the emissive surface of the QPI device 760. The exemplary embodiment of FIG. 7 illustrates the full assembly of the spatio-optical directional light modulator of this invention. The typical total thickness of the exemplary embodiment of the spatio-optical directional light modulator of this invention illustrated in FIG. 7 would be less than 5 millimeters. Such compactness of the directional light modulator of this invention is not possibly achievable by directional light modulation techniques of the prior art.

Figure 8:
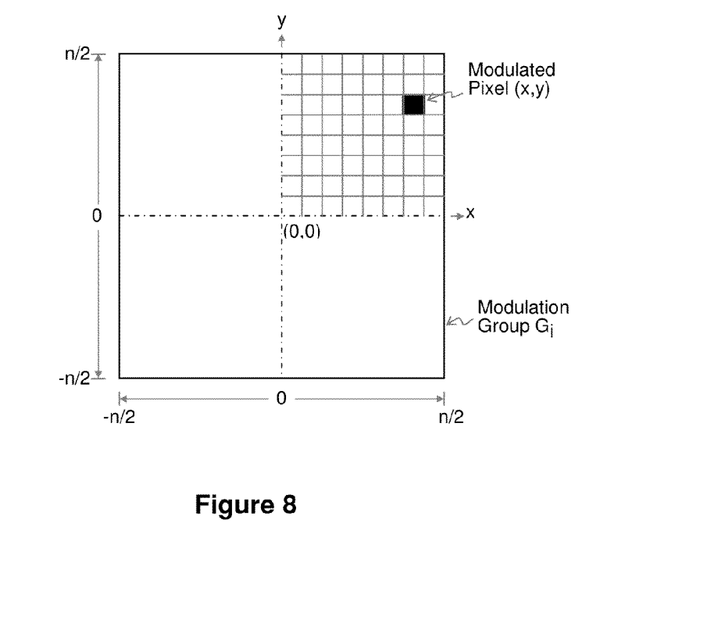
FIG. 8 illustrates the directional modulation range of an exemplary embodiment of the spatio-optical directional light modulator of this invention.
Figure 9:
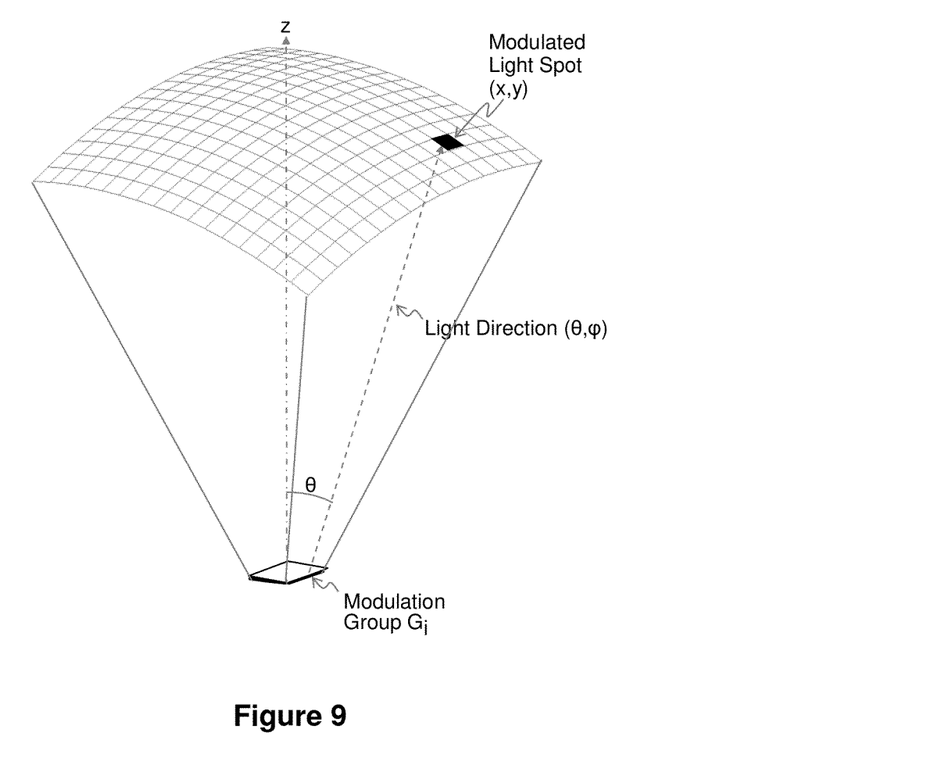
FIG. 9 illustrates the angular addressability in 3D space for an exemplary embodiment of the spatio-optical directional light modulator of this invention.

FIG. 8 and FIG. 9 illustrate the operational principles of the spatio-optical directional light modulator of this invention. FIG. 8 illustrates an exemplary embodiment of one of the modulation groups $G_i$ being comprised of a two dimensional array of (n×n) of the emissive pixels of the QPI device whereby for convenience the size of the pixel group $G_i$ along one axis would be selected to be $n=2^m$. Referring to FIG. 8, the directional modulation addressability that can be achieved by the pixel group $G_i$ would be accomplished through the addressability of the pixels comprising the modulation group $G_i$ along each of its two axes x and y using m-bit words. FIG. 9 illustrates the mapping of the light emitted from (n×n) pixels comprising the QPI device pixel group $G_i$ into individual directions within the three dimensional volume defined by angular divergence $\pm\Theta$ of the associated WLO micro lens such as that of the exemplary embodiment 600. As an illustrative example, when the dimensions of the individual pixels of the QPI device are (5×5) microns and the QPI device pixel group is comprised of $(n \times n) = (2^8 \times 2^8) = (256 \times 256)$ pixel array and the angular divergence of the associated WLO micro lens is $\Theta = \pm 15°$, then from each of the QPI device two dimensional modulation pixel groups $G_i$ of size (1.28× 1.28) millimeter at the QPI device emissive surface it would be possible to generate $(256)^2 = 65,536$ individually addressable directional light beams spanning the angular divergence of $\Theta = \pm 15°$ whereby the light generated in each of the 65,536 directions can be individually modulated in color and intensity as well, typically using a relatively high frequency pulse width modulation of each pixel color component, though other control techniques could be used if desired, such as proportional control.

Any desired spatial and directional modulation capabilities for the QPI device based spatio-optical directional light modulator of this invention would be possible using an array of (N×M) of the directional modulation groups $G_i$ such as that described in the previous design example. If, for example, it is required to create a spatio-optical directional light modulator with spatial modulation resolution of N=320 by M=240 that provides $(256)^2 = 65,536$ directional modulation resolution, the spatio-optical directional light modulator of this invention would comprise an array of (320×240) directional modulation groups and when a QPI device with (5×5) micron pixel size is used, the total size of the spatio-optical directional light modulator would be approximately 41×31 cm. The light emitted from such a spatio-optical directional light modulator can be spatially modulated at a resolution of (320×240) and directionally modulated at a resolution of 65,536 within the angular divergence $\pm\Theta$ associated with its WLO micro lens array (for example $\Theta = \pm 15°$ for the exemplary embodiment 600) and can also be modulated in color and intensity in each direction.

The resolution of the directional modulation of the light modulators of this invention in terms of the number of individually addressable directions within the angular divergence $\pm\Theta$ of the wafer level micro lens array would be determined by selecting either the pixel pitch of the emissive micro emitter array QPI device or by selecting lens pitch of the wafer level micro lens array, or a combination of the two. It is obvious to a person skilled in the art that the lens system, such as that illustrated in FIG. 6, can be designed to allow either wider or narrower angular divergence $\pm\Theta$. It is also obvious to a person skilled in the art that either a smaller or a larger number of pixels within each modulation group $G_i$ can be used to generate any desired directional modulation resolution.

Depending of the total pixel resolution of the QPI device used, such a spatio-optical directional light modulator can be implemented using a tiled array comprising a multiplicity of QPI devices. For example if a QPI device with (1024×1024) pixel resolution is used, then each such QPI device can be used to implement an array of (2×2) modulation groups $G_i$ and the spatio-optical directional light modulator having (6×6) spatial light modulation resolution and 65,536 directional light modulation resolution would be implemented using a tiled array (3×3) of such QPI devices such as in the illustration of FIG. 11.

Figure 11:
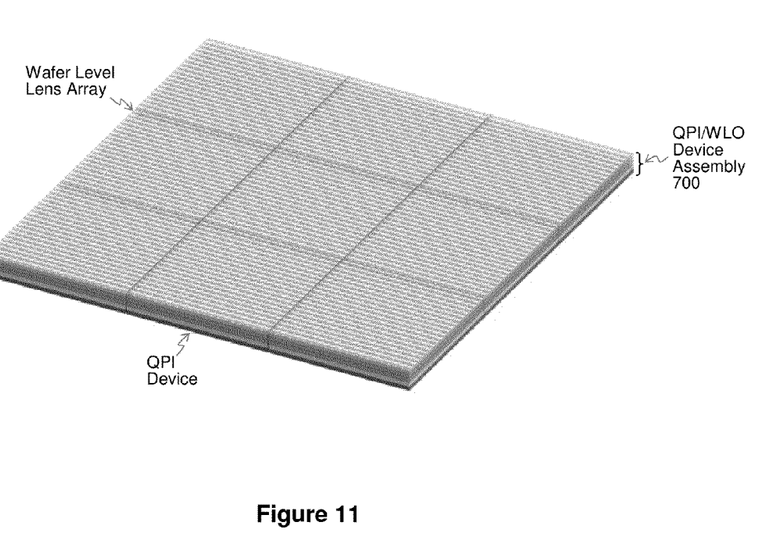
FIG. 11 is an isometric view of an exemplary embodiment of the spatio-optical directional light modulator of this invention implemented by tiling a multiplicity of the exemplary design illustrated in FIG. 6.

The tiling of an array of QPI devices to implement the spatio-optical directional light modulator of this invention is made possible because of the compactness that can be achieved by the emissive QPI devices and the associated WLO. For example, with an implementation such as that illustrated in FIG. 7, it would be possible to fabricate a QPI device/WLO assembly such as that illustrated in FIG. 7 with width, height and thickness of 5.12×5.12×5 millimeters; respectively, to realize the (2×2) modulation group spatio-optical directional light modulator of the previous example. It would also be possible to implement such a QPI device/WLO assembly with its electrical interfaces being a micro ball grid array (MBGA) located at the opposite side of its emissive surface, which would allow the entire top surface of the QPI device/WLO assembly to constitute the emissive surface of the device, which in turn would make it possible to seamlessly tile multiplicity of such QPI device/WLO assemblies to implement any desired size of the spatio-optical directional light modulator of this invention. FIG. 11 is an illustration of the tiling of multiplicity of the QPI device/WLO assemblies to implement an arbitrary size of the spatio-optical directional light modulator of this invention.

The principle of operation of the spatio-optical directional light modulator of this invention will be described in reference to the illustrations of FIGS. 8 and 9. FIG. 8 illustrates the two dimensional addressability of each of the modulation groups $G_i$ using m-bit resolution for the directional modulation. As explained earlier, light emitted from $(2^m \times 2^m)$ individual pixels in an n×n array of the modulation group $G_i$ is mapped by its associated WLO elements into $2^{2m}$ light directions within the angular divergence $\pm\Theta$ of the associated WLO micro lens. Using the (x,y) dimensional coordinates of the individual pixels within each of the modulation groups $G_i$, the angular coordinates $(\theta,\phi)$ of the emitted light beam is given by:

$$\theta = \arctan\left[\frac{\sqrt{x^2+y^2} \times \tan(\Theta)}{0.5 \times (n-1)}\right] \quad \text{Equation 1}$$

$$\varphi = \arctan\left[\frac{y}{x}\right] \quad \text{Equation 2}$$

Where the angles $(\theta, \phi)$ are spherical coordinates with the polar axis at $\theta=0$ parallel to the z axis of the emissive surface of the modulation group $G_i$ and $m = \log_2 n$ is the number of bits used to express the x and y pixel resolution of the modulation group $G_i$.

The spatial resolution of the spatio-optical directional light modulator of this invention is simply defined by the coordinates of each of the individual modulation group $G_i$ within the two dimensional array of modulation groups comprising the overall spatio-optical directional light modulator. There is of course, some cross talk between pixels of one group and the micro lens for an adjacent group. However the cross talk is substantially reduced by the following design aspects. First, because of the inherently collimated light emission of the QPI device, the light emitted from the QPI device pixels is typically confined to a $\pm 17°$ cone for the case when the QPI device pixels are light emitting diode or to a $\pm 5°$ cone for the case when the QPI device pixels are laser diodes. Thus placing the wafer level optics (WLO) collimation lens elements close to the emissive surface 660 of the QPI device as illustrated in FIG. 6 will make most of the light emitted from each modulation group edge pixels be confined to its associated WLO lens element 600. Second, as an added measure, a few (some) edge pixels of each pixel group are turned off to further avoid leakage of light (cross-talk) between adjacent lenses of the WLO micro lens array. For example, given the ±17° confined emission of the QPI device with its pixel arc light emitting diodes and the close placement of the first micro lens element as illustrated in FIG. 6, simulation shows that a dark ring around the outer edge of the modulation group comprising as few as only 5 pixels will reduce the cross-talk to below 1%. When the QPI device pixels are laser diodes, the required number of turned off pixels will be even less and may be not even required since in this case the QPI device pixel light emission is confined to an even much narrower ±5° cone. The end result may be some (a few) inactive, blank or dead pixel positions between active pixels in the QPI devices in the array. Of course baffles and/or band-limiting light diffusers could be used if desired, though they tend to complicate the design of the light modulator and cause excessive loss of light.

Figure 10:
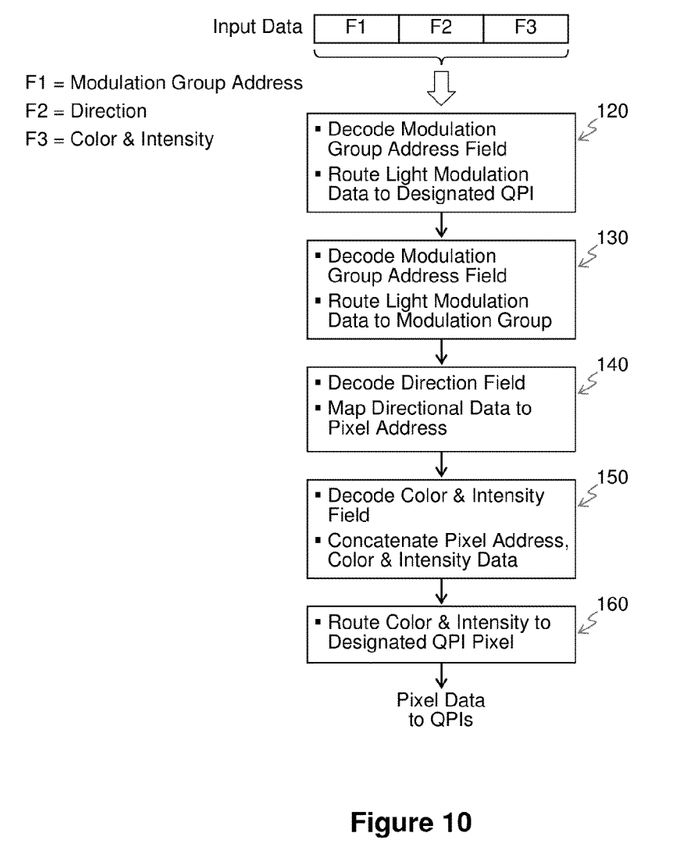
FIG. 10 is a block diagram explaining the data processing block diagram of the spatio-optical directional light modulator of this invention.

FIG. 10 illustrates exemplary embodiment of the data processing block diagram of the spatio-optical directional light modulator of this invention. The input data to the spatio-optical directional light modulator of this invention will be formatted in multiple bit words whereby each input word contains the three fields; one field being the address of modulation group $G_i$ within the modulation group array comprising the spatio-optical directional light modulator while the remaining two data fields provide the data representation of the light to be emitted from that modulation group in terms of its color, intensity and direction. Referring to FIG. 10, the data processing block 120 decodes the modulation group address field of the input data and routes the light modulation data fields to the QPI device associated with the designated modulation group. The data processing block 130 decodes the routed modulation group address field and maps it to the address of the designated modulation group. The data processing block 140 decodes the directional modulation data field and maps it into the designated pixel address within the modulation group. The data processing block 150 concatenates the resultant pixel address with the associated light intensity and color data fields of the input data. The data processing block 160 decodes the designated pixel address and routes the light modulation data to the designated pixel within the designated QPI device comprising the spatio-optical directional light modulator.

In using the directional modulation resolution of 16-bit of the previously described example and the typical 24-bit of resolution for representing the modulated light intensity and color in each direction, the total number bits that would represent the modulation data word for each modulation group would be 40-bit. In assuming, without loss of generality, that such 40-bit words would be inputted to the spatio-optical directional light modulator of this invention for addressing its constituent modulation groups sequentially; i.e., sequential addressing is used to input the modulation group data 40-bit words. Block 120 of FIG. 10 would be responsible for routing the sequentially inputted data word to the designated QPI device. Block 130 of FIG. 10 would be responsible for routing the modulation data to the designated modulation group. Block 140 of FIG. 10 would be responsible for mapping the 16-bit directional modulation data field into the designated address of the pixel with the designated modulation group. Block 150 of FIG. 10 would be responsible for concatenating the 24-bit light intensity and color data with the mapped pixel group address. Block 160 of FIG. 10 would be responsible for routing the 24-bit light intensity and color modulation data to the designated pixel within the designated QPI device comprising the spatio-optical directional light modulator. With this exemplary data processing flow of the 40-bit word sequential data input, the spatio-optical directional light modulator of this invention would modulate the light emitted from its aperture in intensity, color and direction based on the information encoded with its input data. The light intensity and color modulation may be, by way of example, pulse width modulation of the on/off times of the multi color pixels to control the average intensity of the light and to control the intensity of each color component making up the resulting color, though other control techniques may be used if desired. In any event, the direction and intensity are controlled, and color, direction and intensity are controlled in a multi color system.

Possible Applications

The spatio-optical directional light modulator of this invention can be used as a backlight for liquid crystal display (LCD) to implement a 3D display. The spatio-optical directional light modulator of this invention by itself can be used to implement a 3D display of an arbitrary size that is realized, for example, as a tiled array of multiplicity of QPI devices/WLO assemblies such as that illustrated in FIG. 10. The light modulator of this invention can also be operated as a 2D high resolution display. In this case the individual pixels of the QPI device would be used to modulate the color and intensity while its integrated WLO would be used to fill the viewing angle of the display It is also possible for the light modulator of this invention to be switched from 2D to 3D display modes by adapting the format of its input data to be commensurate with the desired operational mode. When the light modulator of this invention is used as a 2D display, its light angular divergence will be that associated with its WLO micro lens array ±Θ and the pixel resolution of the individual modulation group $G_i$ will be leveraged to achieve higher spatial resolution.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention as defined by the full breadth of the following claims.

What is claimed is:

1. A light modulator for displaying a 3D image comprising:
   an emissive micro emitter array device having a micro array of light emitting pixels each light emitting pixel being individually addressable and individually controllable in intensity of light emitted by the respective light emitting pixel, the micro array of light emitting pixels being organized into multiple groups of multiple light emitting pixels, and
   a micro lens array, each micro lens in the micro lens array spanning a group of light emitting pixels of the emissive micro emitter array device, each micro lens in the micro lens array directing light received from each light emitting pixel of the emissive micro emitter array device in the respective group of light emitting pixels in a different direction.

2. The light modulator of claim 1 wherein each group of light emitting pixels is a two dimensional group of light emitting pixels.

3. The light modulator of claim 2 wherein the emissive micro emitter comprises a micro array of light emitting pixels wherein each of the light emitting pixels is a solid state light emitter.

4. The light modulator of claim 3 wherein each light emitting pixel of the emissive micro emitter array device may emit light of multiple colors, and each light emitting pixel is individually addressable to emit light of a respective selected color and intensity.

5. The light modulator of claim 3 wherein the light emitting pixels of the emissive micro emitter array device have a linear dimension of ten microns or less.

6. The light modulator of claim 3 wherein the micro lens array is comprised of a plurality of stacked micro lens arrays.

7. The light modulator of claim 6 wherein the plurality of stacked micro lens arrays are aligned relative to one another and relative to the light emitting pixel array using semiconductor wafer alignment techniques.

8. The light modulator of claim 3 wherein each of the micro lenses of the micro lens array optically maps the light emitted from a plurality of light emitting pixels in a respective group of light emitting pixels into a corresponding discrete set of directions within a numerical aperture of the micro lens.

9. The light modulator of claim 8 wherein the association of each micro lens with the light emitting pixels within a light emitting pixel group to optically map the light emitted from the plurality of light emitting pixels of the group into a corresponding discrete set of directions allows the individual light emitting pixel addressability to enable the individual addressability of each direction of the discrete set of directions, thereby enabling the light modulator to generate light that is directionally modulated in any of the directions of the set of discrete directions.

10. The light modulator of claim 3 wherein:
the light emitting pixels of the emissive micro emitter array device are multi color light emitting pixels and are individually addressable to emit light with a selected color and intensity;
the micro lens array has a plurality of stacked micro lens arrays, each of the micro lenses of the micro lens array is associated and aligned with a plurality of light emitting pixels within a light emitting pixel group of the emissive micro emitter array device, with each micro lens optically mapping the light emitted from the respective plurality of light emitting pixels into a corresponding discrete set of directions within a numerical aperture of the respective micro lens to enable the individual control of color and intensity of the light emitted in each individual direction of the discrete set of directions:
thereby enabling the light modulator to generate light that is modulated in color, intensity and direction.

11. The light modulator of claim 10 wherein the direction, color and intensity addressability of the light modulator is accomplished using a multiple field data input to the light modulator, whereby for each designated light emitting pixel group within the light emitting pixel groups, at least one input data field is used to specify the direction of the emitted light and at least one input data field is used to specify the color and intensity of the light emitted in that direction.

12. The light modulator of claim 3, in plurality, comprising a collective set of light modulators in a tiled array, wherein in each light modulator, the light emitting pixels of the emissive micro emitter array device are multicolor light emitting pixels and are individually addressable to each emit light with a selected color and intensity, the micro lens array is comprised of a plurality of stacked micro lens arrays, each of the lenses of the micro lens array is associated and aligned with a plurality of light emitting pixels within a respective light emitting pixel group of the respective emissive micro emitter array device, with each micro lens optically mapping the light emitted from the plurality of light emitting pixels into a corresponding discrete set of directions within a numerical aperture of the lens to enable the individual control of color and intensity of the light emitted in each individual direction of the discrete set of directions, thereby enabling the light modulator to generate light that is modulated in color, intensity and direction across an aperture spanning the collective set of light modulators.

13. The light modulators of claim 12 wherein adjacent light modulators in the tiled array have some inactive edge light emitting pixels between active light emitting pixels in adjacent groups of light emitting pixels.

14. The light modulators of claim 12 wherein the direction, color and intensity addressability of each light emitting pixel of the light modulators is accomplished using a multiple field data input to the individual light modulators, whereby for each designated light emitting pixel group within the light emitting pixel groups, at least one input data field is used to specify the spatial direction of the emitted light and at least one input data field is used to specify the color and intensity of the light emitted in that direction.

15. The light modulators of claim 14 wherein the light modulators are switchable to operate either as a 3D display or as a high resolution 2D display by adapting the format of the multiple field data input to be commensurate with the desired operational mode.

16. The light modulators of claim 12 in a liquid crystal display as a backlight for the liquid crystal display to create either a 3D display or 2D display.

17. The light modulators of claim 16 wherein the liquid crystal display is switchable to operate either as a 3D display or as a high resolution 2D display by adapting the format of the multiple field data input to be commensurate with the desired operational mode.

18. The light modulator of claim 3 wherein the resolution of the light modulators in terms of the number of individually addressable directions within an angular divergence of the micro lens array being determined by selecting either a light emitting pixel pitch of the emissive micro emitter array device or by selecting a micro lens pitch of the micro lens array, or by selecting the light emitting pixel pitch of the emissive micro emitter array device and by selecting the micro lens pitch of the micro lens array.

19. The light modulator of claim 2 wherein the emissive micro emitter comprises an array of light emitting pixels wherein each of the light emitting pixels is a solid state light emitter selected from the group consisting of light emitting diodes and laser diodes.

20. The light modulator of claim 1 wherein the micro lens array is fabricated as a wafer level optics using ultraviolet imprint lithography at the wafer level.

21. The light modulator of claim 1, in plurality, comprising a tiled array of light modulators.

22. The light modulators of claim 21 wherein adjacent light modulators in the tiled array have some inactive edge light emitting pixels between active light emitting pixels in adjacent groups of light emitting pixels.

23. A light modulator for displaying a 3D image comprising:
an emissive micro emitter array device having a micro array of light emitting pixels, and
a micro lens array, each micro lens in the micro lens array spanning a group of light emitting pixels of the emissive micro emitter array device, whereby a micro lens in the micro lens array will direct illumination from each emissive micro emitter in the respective group of light emitting pixels in a different direction;

the light emitting pixels of the emissive micro emitter array device being multi color pixels and are individually addressable to emit light with a selected color and intensity;

the micro lens array having a plurality of stacked micro lens arrays, each of the lenses of the micro lens array being associated and aligned with a plurality of light emitting pixels within a pixel group of the emissive micro emitter array device, with each micro lens optically mapping the light emitted from the respective plurality of light emitting pixels into a corresponding discrete set of directions within a numerical aperture of the respective lens to enable the individual control of color and intensity of the light emitted in each individual direction of the discrete set of directions;

thereby enabling the light modulator to generate light that is modulated in color, intensity and direction.

24. A light modulator comprising a collective set of light modulators in a tiled array, each light modulator for displaying a 3D image comprising:

an emissive micro emitter array device having a micro array of pixels, and a micro lens array, each micro lens in the micro lens array spanning a two dimensional group of light emitting pixels of the emissive micro emitter array, whereby a micro lens in the micro lens array device will direct illumination from each emissive micro emitter in the respective group of light emitting pixels in a different direction;

wherein each of the light emitting pixels in the emissive micro emitter device is a solid state light emitter that is individually addressable, the solid state light emitter being selected from the group consisting of light emitting diodes and laser diodes; and wherein in each light modulator, the light emitting pixels of the emissive micro emitter array device are multicolor light emitting pixels and are individually addressable to each emit light with a selected color and intensity, the micro lens array is comprised of a plurality of stacked micro lens arrays, each of the lenses of the micro lens array is associated and aligned with a plurality of light emitting pixels within a respective light emitting pixel group of the respective emissive micro emitter array device, with each micro lens optically mapping the light emitted from the plurality of light emitting pixels into a corresponding discrete set of directions within a numerical aperture of the lens to enable the individual control of color and intensity of the light emitted in each individual direction of the discrete set of directions, thereby enabling the light modulator to generate light that is modulated in color, intensity and direction across an aperture spanning the collective set of light modulators.

* * * * *